Aug. 1, 1939.  W. H. McELWAIN  2,168,266
METHOD AND MECHANISM FOR WINDROWING
Filed June 8, 1936  3 Sheets-Sheet 2
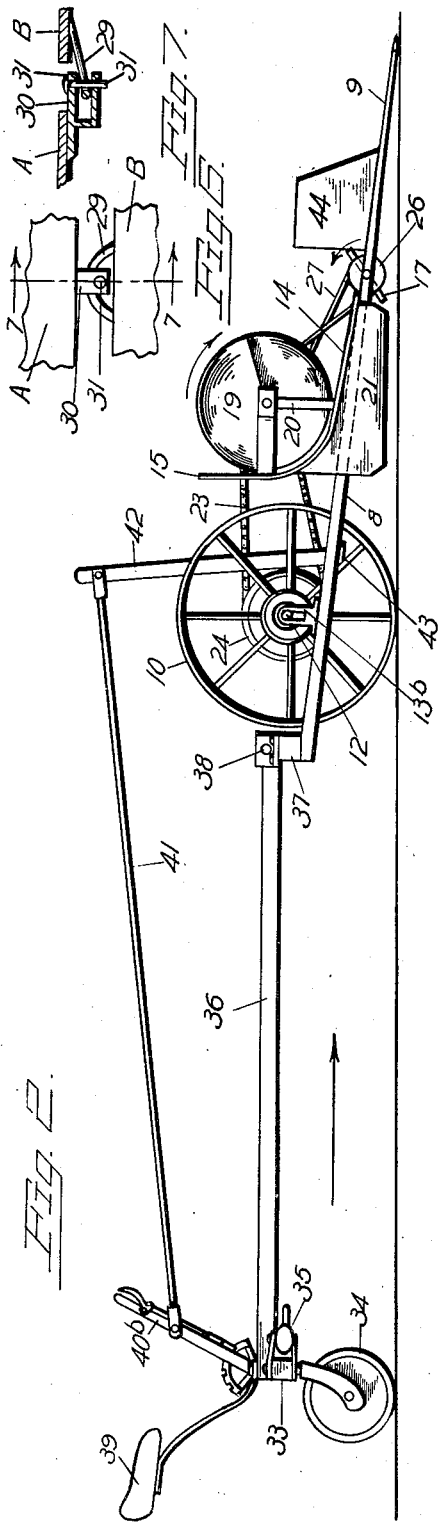
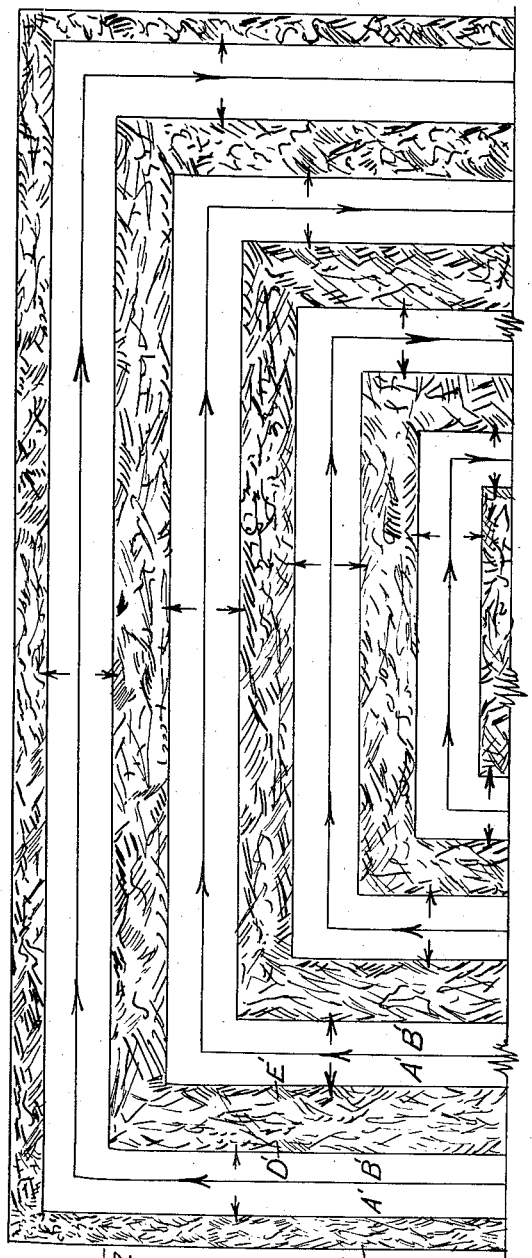
INVENTOR.
WILLIAM H. McELWAIN
BY
ATTORNEY.

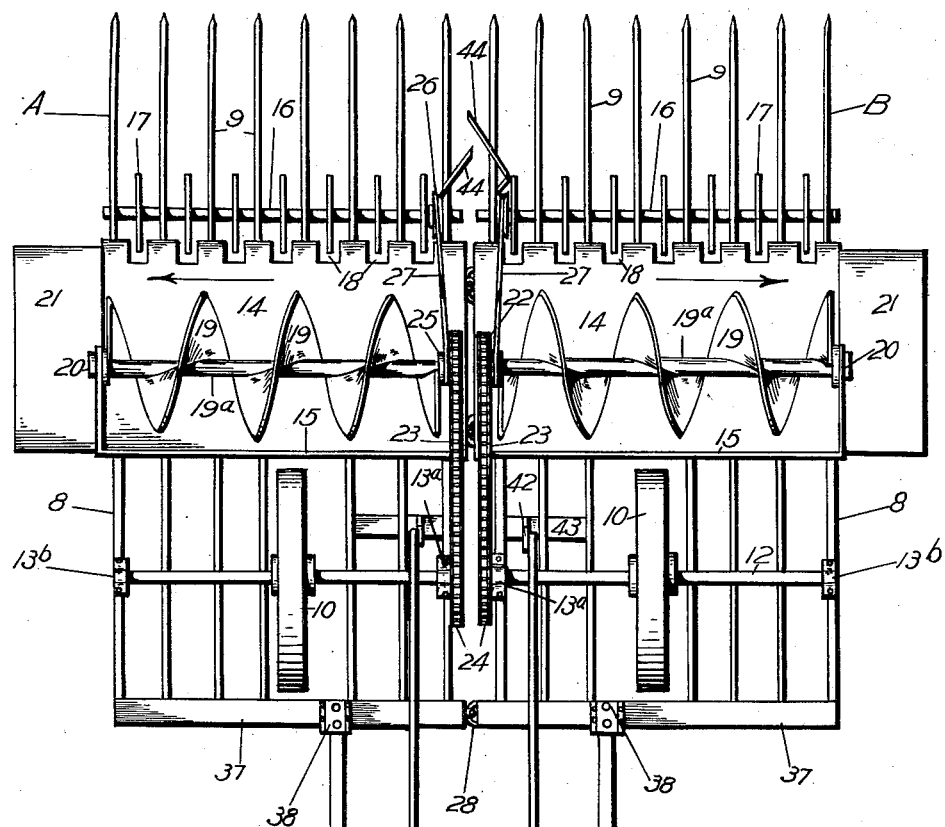
Fig. 1.
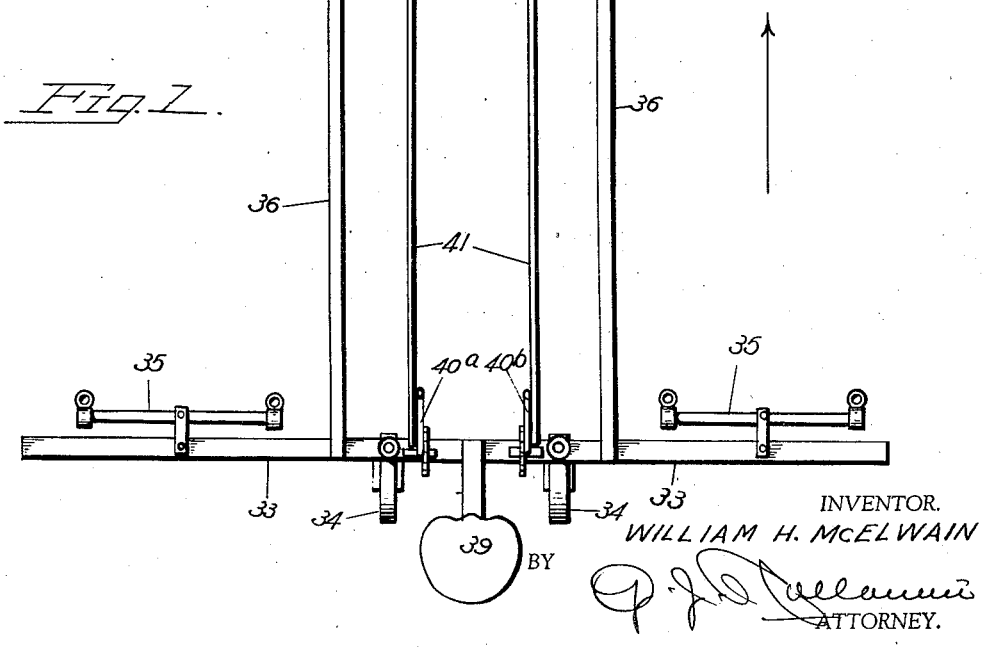
INVENTOR.
WILLIAM H. McELWAIN
BY
ATTORNEY.

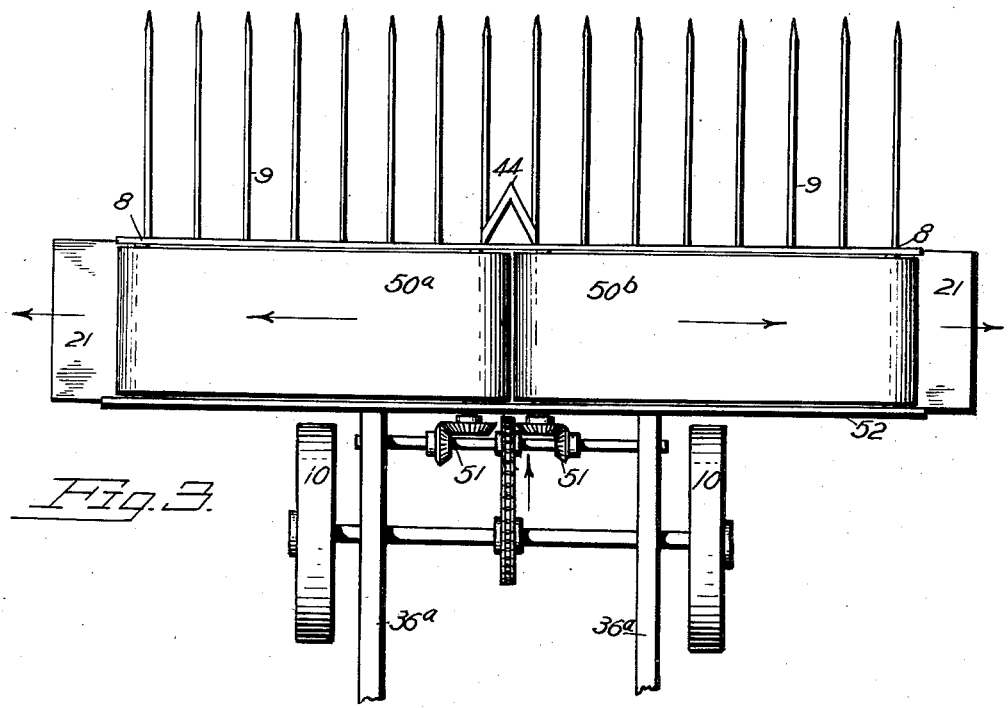
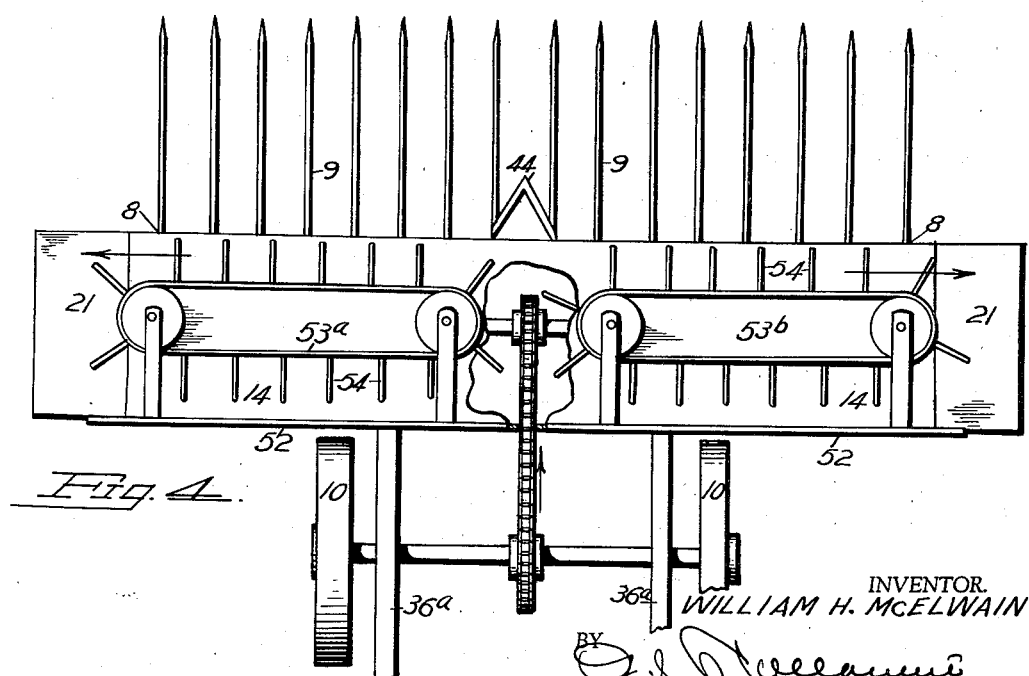

Patented Aug. 1, 1939

2,168,266

UNITED STATES PATENT OFFICE 2,168,266

METHOD AND MECHANISM FOR WINDROWING

William H. McElwain, Denver, Colo., assignor of one-half to Paul M. Clark and one-half to John M. Eckley, both of Denver, Colo.

Application June 8, 1936, Serial No. 84,145

17 Claims. (Cl. 56—376)

This invention relates to an improved hay rake, and more particularly relates to a method and mechanism for windrowing.

It is an object of the present invention to discharge hay collected on a rake at substantially the same rate as it is fed onto the same, and without appreciable delay in its movement across the rake to the discharge.

Another object of the invention is the provision of a novel method of windrowing hay fields and the like whereby only a portion of the cut hay in a field is moved in making the windrows.

A further object of the invention is to provide a pair of co-acting rakes, each of which is mounted for limited independent movement to permit its adjustment during operation to a position in which all its teeth bear against the surface of the earth over which it is moved.

Still another object of the invention is to provide a hay rake provided with a mechanism for the positive discharge of collected hay at opposite sides of the same.

A still further object of the invention is to provide a raking mechanism which is of simple and durable construction and which operates efficiently and positively under varying conditions of use.

In raking hay and the like, it is necessary in order to attain proper results, that the rake follow the course of the mower, the teeth of the rake being moved along the ground under the cut grasses, which slide along the teeth and collect on the upper surface of the rake. The collected hay is removed at intervals and piled in the field to form windrows. As much as one-half ton of hay will be collected in this manner prior to discharge, and it is obvious that under such conditions, the operation is necessarily slow, regardless of whether the rake is moved by a tractor or by animals, such as horses.

The present invention is designed to lighten the load on the rake, and the continuous discharge has the effect of maintaining a substantially uniform load at all times.

To afford a better understanding of the raking mechanism and its operation, reference will now be made to the accompanying drawings in the several views of which like parts have been similarly designated, and in which Figure 1 is a plan view of a preferred form of raking mechanism;

Figure 2 is a side elevation of the mechanism of Figure 1;

Figure 3 is a fragmentary plan view of a modified form of raking mechanism;

Figure 4 is a fragmentary plan view of another embodiment of the raking mechanism;

Figure 5 is a diagrammatic view of a hay field, illustrating the method of windrowing of the present invention;

Figure 6 is an enlarged plan view of the coupling used for holding two rake-sections in operative relation; and Figure 7 is a section taken along the line 7—7, Figure 6.

Referring first to Figures 1 and 2, a hay rake or sweep 8 having a row of teeth 9 of conventional construction, is formed of two co-acting sections designated A and B.

The rear end of each rake section is supported in an elevated position by a wheel 10 on a shaft 12 journaled at 13a and 13b on the rake. The forward end of each rake section normally rests on the earth over which the rake is moved so that the teeth 9 will slide under the mowed hay.

Intermediate the ends of each rake section, a platform 14 extends across the rake, and receives the hay moved onto the rake during its forward progress. The platform 14 terminates at its rear end in an upwardly ranging wall 15 which acts as a guard to prevent the escape of hay acted on by the conveyor.

To further aid the movement of hay onto platform 14, a rotary shaft 16 carrying a series of fingers 17 is positioned forwardly of the platform whose forward end is slotted as indicated at 18 to provide passages for the fingers during their rotation.

The fingers 17 exert an elevating action on the hay, as well as pushing the same onto the platform and effectively prevent the hay from passing underneath the platform as it moves rearwardly.

A screw or spiral conveyor 19 is mounted on supports 20 for rotation over the platform 14. The conveyor on section B has a right hand thread, and the conveyor on section A has a left hand thread, and a chute 21 is provided at the discharge end of each platform to direct the falling hay beyond the path of the rake.

Any suitable driving mechanism may be provided for shaft 16 and spirals 19. In Figure 1 a satisfactory arrangement has been illustrated in which a sprocket wheel 22 is mounted on the inner end of the spiral shaft 19a, and is driven by a chain 23 carried on another sprocket wheel 24 mounted for conjoint rotation on shaft 12.

A pulley 25 is disposed on shaft 19a adjacent sprocket wheel 22, and acts as the driving element for a pulley 26 on shaft 16 connected therewith by a belt 27 which is crossed to cause the shaft 16 to rotate in a direction reversed with respect to the rotation of shaft 19a.

The rake sections A and B are held for co-action at two or more places along their adjoining sides, by universal joints 28, which as best shown in Figures 6 and 7, consist of a clevis 29 on section B, and a pair of apertured lugs 30 on section A, through which a bolt 31 extends, and is held by a nut 32. From the foregoing, it will be apparent that each section may move upwardly or downwardly through a considerable range independently of the other, and at the same time, any spreading tendency of the sections is restrained.

Any suitable driving arrangement may be utilized, and for purposes of illustration, the mechanism is shown as being of the horse-drawn form. The rakes are of the pusher type, and to this end a frame 33 supported on wheels 34 of the castor type, carries adjacent each end, a single-tree 35. A bar 36 connects the frame 33 with a cross beam 37 at the rear end of each of the rake sections A and B. The bar is fixed on frame 33, and terminates in a universal joint 38 on beam 37, so that each rake section is free to tip in following the contour of the ground, while it is being moved.

A driver's seat 39 is carried on frame 33 and levers 40a and 40b on each side of the seat are each connected by a rod 41 with an arm 42 fixed on a beam 43 on the rake sections A and B, respectively.

By drawing the lever rearwardly, the operator can raise the rake off the ground as is sometimes required in turning corners, and in clearing ditches, stones and the like.

To prevent hay feeding into the chain and pulley drives, baffles 44 are located on the inner sides of the rakes forwardly of shaft 16 to direct the hay laterally onto the platform.

In operation, two horses are hitched to the single-trees 35, and the mechanism is driven along the course of the mower in the same direction the mower traveled. The teeth 9 at the forward end of the rakes are permitted to rest on the ground, and slide underneath the mowed grasses and carry the same rearwardly.

The fingers 17 on shaft 16 elevate the hay moved within their sphere of rotation, and push the same onto platform 14 where it is immediately acted on by the screw conveyor 19, which progressively moves it to the outer side of the rake section where it discharges across chute 21.

It is apparent that no considerable quantity of hay accumulates on the rakes during operation, since the discharge substantially balances the intake at any given time. The discharge is continuous, once the operation has started, and the chutes direct the discharged hay onto the ground in such a manner that the formation of even windrows is easily effected.

In moving around a field, the contour frequently changes, and the position of rest of the teeth of each rake section determines the position of one section relative to the other.

The plane of the ends of the teeth of one section may be level while the other is inclined, both may be inclined at the same or different angles, or both may be level. The universal joints between the sections permit limited movement of one relative to the other, and when the contour of the ground under each rake is different, each rake is free within certain limits to adjust its position on the ground.

The foregoing arrangement insures a clean removal of hay from all surfaces of the field and the positive continuous discharge effects an elimination of excessive loads and makes possible the formation of windrows having substantially uniform quantities of hay throughout their length.

Referring now to Figure 5, the novel method of windrowing of the present invention will be explained. The diagram represents a mowed field windrowed by a rake of the type described and illustrated herein.

The space between any two solid lines represents the width of one of the rake sections A or B. The initial circuit of the field by the rake mechanism is along the outermost unshaded course in the direction indicated by the arrows. The rake section A travels the path A' and the rake section B travels the path B'. Hay removed from A' is deposited on the hay already in place on the course designated C'. Hay removed from B' is discharged onto the course D'.

In the next circuit of the field, the course A' is distant two courses from the course B' of the initial circuit, and hay removed from the second A' course is deposited on the course E'.

Thus the courses D' and E' each contain the hay from two courses, and only half the amount present has been moved. After the hay has dried sufficiently to require turning, the rake again proceeds through the field, this time traveling along the D' E' course and similar courses, and depositing the hay on the B' course of one circuit and the A' course of the next circuit.

As a result of this operation, the hay is turned and again deposited in such a way that the product of four courses is contained in two.

It will be understood that if a greater spacing is desired, for example, a width of three courses between circuits is employed, the product of five courses will be contained in three. The first described operation will be preferred, however, under most conditions.

The foregoing method of windrowing eliminates substantially one-half the handling formerly required, and by eliminating the loads on the present mechanism, a much faster operation is attained than would otherwise be possible.

As a result, a field of a given size can be raked and windrowed in a fraction of the time formerly required, and the second or turning operation can be included in substantially the same time formerly required for windrowing alone.

The other structures illustrated are substantially the same as the mechanism of Figure 1 with the exception of the conveyor element of the same.

In Figure 3, a rake mechanism is shown in which endless belts 50a and 50b moving in the directions indicated by the arrows receive the hay from the teeth 9 and move the same to the discharge chute 21. The belts 50a and 50b are driven by the same chain and sprocket wheel drive hereinbefore described, through the intermediary of suitable gearing as indicated at 51. Since the drive is only shown for the purpose of disclosing an operative arrangement, further description of the same appears unnecessary.

A retaining wall 52 at the rear end of the conveyor assembly prevents escape of hay therefrom and is similar in function to the upright wall 15 of platform 14 in Figure 1.

In Figure 4, another form of endless belt conveyor is illustrated in which the belts 53a and 53b travel in a horizontal plane instead of a vertical plane as in Figure 3. The belts 53a and 53b carry a series of fingers 54 which engage the hay and move the same along the platform 14 to the chute 21. A retaining wall 52 is also used in this construction.

As illustrated, the rake mechanisms of both Figures 3 and 4 involve a unitary rake assembly in place of the sectional construction shown in Figure 1. The bars 36a of these rake mechanisms correspond in construction and function to the bars 36 of Figure 1. The frame 33 and component elements will also be employed with these forms of the invention, although the same have not been illustrated. Only one elevating mechanism is required, when a unitary rake is used.

It will be understood however, that if desired, any form of conveyor may be used with the sectional rake assembly, and if desired, the shaft 16 may be employed in all forms of the invention.

In smaller sized rakes, the sectional arrangement will probably not be necessary as the teeth 19 will follow the contour of the ground, but in the larger sizes, the sectional arrangement will be advantageous in permitting each side of the rake to move independently in following the surface contours.

The feature of discharging continuously from opposite sides of the mechanism permits windrowing in the manner hereinbefore described, and all forms of the invention are effective in eliminating excessive loads during raking.

Changes and modifications may be availed of within the spirit and scope of the invention as defined in the hereunto appended claims.

What I claim and desire to secure by Letters Patent is:

1. The method of windrowing mowed grasses and the like, which comprises raking mowed grasses in a course between deposits of previously mowed grasses, and distributing the raked grasses in windrows at opposite sides of the raked course, on other deposits of mowed grasses.

2. The method of windrowing mowed grasses and the like, which comprises raking mowed grasses in a course between deposits of previously mowed grasses, and distributing the raked grasses in substantially uniform quantities in windrows at opposite sides of the raked course, on other deposits of mowed grasses.

3. The method of windrowing mowed grasses and the like, which comprises raking mowed grasses in a course between deposits of previously mowed grasses, and distributing the raked grasses simultaneously at opposite sides of the raked course, on other deposits of mowed grasses in a progressive movement along the same.

4. A device of the character described comprising a carriage, a rake-element supported at an end of the carriage with the ends of its teeth forward thereof resting on a surface over which it is moved in a position to collect loose material from such surface during forward movement of the carriage, a conveyor mechanism supported on the carriage rearwardly of the forward ends of the teeth in the path of material lifted thereby, inclusive of means for dividing such collected material and depositing it at opposite sides of the carriage, and means on the carriage for actuating the conveyor mechanism during forward movement of the carriage.

5. A device of the character described comprising a carriage, a rake-element supported at an end of the carriage with the ends of its teeth forward thereof resting on a surface over which it is moved in a position to collect loose material from such surface during forward movement of the carriage, a conveyor mechanism supported on the carriage rearwardly of the forward ends of the teeth in the path of material lifted thereby, inclusive of means for dividing such collected material and depositing it at opposite sides of the carriage, means on the carriage for actuating the conveyor mechanism during forward movement of the carriage, and a pusher member disposed on the rake-element between the forward ends of the teeth and the conveyor to intercept and direct collected material to the conveyor.

6. A device of the character described comprising a carriage, a rake-element supported at an end of the carriage with the ends of its teeth forward thereof resting on a surface over which it is moved in a position to collect loose material from such surface during forward movement of the carriage, a conveyor mechanism supported on the carriage rearwardly of the forward ends of the teeth in the path of material lifted thereby, inclusive of means for dividing such collected material and depositing it at opposite sides of the carriage, means on the carriage for actuating the conveyor mechanism during forward movement of the carriage, and a stop on the rake-element extending along the rearward side of the conveyor to limit rearward movement of the collected material.

7. A device of the character described comprising a carriage a rake-element supported at an end of the carriage with the ends of its teeth forward thereof resting on a surface over which it is moved in a position to collect loose material from such surface during forward movement of the carriage, a conveyor mechanism supported on the carriage rearwardly of the forward ends of the teeth in the path of material lifted thereby, inclusive of means for dividing such collected material and depositing it at opposite sides of the carriage, means on the carriage for actuating the conveyor mechanism during forward movement of the carriage, and a chute on the rake-element at the discharge end of the conveyor for directing material discharged thereby laterally of the carriage.

8. A device of the character described comprising a carriage, a rake-element supported at an end of the carriage with the ends of its teeth forward thereof resting on a surface over which it is moved in a position to collect loose material from such surface during forward movement of the carriage, a platform disposed on the rake-element rearwardly of the forward ends of the teeth in the path of material lifted thereby, a conveyor mechanism, inclusive of a screw having right and left hand threads disposed over the platform transversely of the rake-element for dividing such collected material and depositing it at opposite sides of the carriage, and means on the carriage for actuating the screw during forward movement of the carriage.

9. A device of the character described comprising a carriage, a rake-element supported at an end of the carriage with the ends of its teeth forward thereof resting on a surface over which it is moved in a position to collect loose material from such surface during forward movement of the carriage, a conveyor mechanism supported on the carriage rearwardly of the forward ends of the teeth in the path of material lifted thereby, inclusive of means for dividing such collected material and depositing it at opposite sides of the carriage, and a power transmitting connection between a carriage wheel and the conveyor mechanism for actuating said mechanism during forward movement of the carriage.

10. A device of the character described, comprising a carriage, inclusive of two wheel-supported sections in side-by-side relation, a rake-element supported at an end of each section with the ends of its teeth forward thereof resting on a surface over which it is moved in a position to collect loose material from such surface during forward movement of the carriage, a conveyor mechanism supported on each section rearwardly of the forward ends of the teeth in the path of material lifted thereby, inclusive of means for depositing such collected material at the open side of the section, said sections being loosely interconnected for limited independent movement to compensate for variations in elevation of the surface over which they are propelled, and means on the carriage for actuating the respective conveyor mechanisms during forward movement of the carriage.

11. A device of the character described, comprising a carriage, inclusive of two wheel-supported sections in side-by-side relation, a rake-element supported at an end of each section with the ends of its teeth forward thereof resting on a surface over which it is moved in a position to collect loose material from such surface during forward movement of the carriage, a conveyor mechanism supported on each section rearwardly of the forward ends of the teeth in the path of material lifted thereby, inclusive of means for depositing such collected material at the open side of the section, said sections being loosely interconnected for limited independent movement to compensate for variations in elevation of the surface over which they are propelled, means on the carriage for actuating the respective conveyor mechanisms during forward movement of the carriage, and means for the simultaneous propulsion of said sections.

12. A device of the character described, comprising a carriage, inclusive of two wheel-supported sections in side-by-side relation, a rake-element supported at an end of each section with the ends of its teeth forward thereof resting on a surface over which it is moved in a postion to collect loose material from such surface during forward movement of the carriage, a conveyor mechanism supported on each section rearwardly of the forward ends of the teeth in the path of material lifted thereby, inclusive of means for depositing such collected material at the open side of the section, said sections being loosely interconnected for limited independent movement to compensate for variations in elevation of the surface over which they are propelled, means on the carriage for actuating the respective conveyor mechanisms during forward movement of the carriage, and a baffle adjacent the adjoining sides of the sections for dividing and directing collected material onto the respective conveyors.

13. A device of the character described, comprising a carriage, inclusive of two wheel-supported sections in side-by-side relation, a rake-element supported at an end of each section with the ends of its teeth forward thereof resting on a surface over which it is moved in a position to collect loose material from such surface during forward movement of the carriage, a conveyor mechanism supported on each section rearwardly of the forward ends of the teeth in the path of material lifted thereby, inclusive of means for depositing such collected material at the open side of the section, said sections being loosely interconnected for limited independent movement to compensate for variations in elevation of the surface over which they are propelled, means on the carriage for actuating the respective conveyor mechanisms during forward movement of the carriage, means for the simultaneous propulsion of said sections, and a universal joint between said last mentioned means and each of the sections to permit limited independent movement of the sections to compensate for variations in elevation of the surface over which they are propelled.

14. A device of the character described comprising a carriage, a rake-element supported at an end of the carriage with the ends of its teeth forward thereof resting on a surface over which it is moved in a position to collect loose material from such surface during forward movement of the carriage, a conveyor mechanism supported on the carriage rearwardly of the forward ends of the teeth in the path of material lifted thereby, inclusive of two endless members for dividing such collected material and depositing it at opposite sides of the carriage, and means on the carriage for actuating the conveyor mechanism during forward movement of the carriage.

15. A device of the character described comprising a carriage, a rake-element supported at an end of the carriage with the ends of its teeth forward thereof resting on a surface over which it is moved in a position to collect loose material from such surface during forward movement of the carriage, a conveyor mechanism supported on the carriage rearwardly of the forward ends of the teeth in the path of material lifted thereby, inclusive of movable means for dividing such collected material and depositing it at opposite sides of the carriage, and a power-transmitting connection between the movable means and a wheel of the carriage for actuating said means during forward movement of the carriage.

16. A device of the character described, comprising a carriage, a rake-element pivotally supported at an end of the carriage with the ends of its teeth forward thereof resting on a surface over which it is moved in a position to collect loose material from such surface during forward movement of the carriage, a conveyor mechanism supported on the carriage rearwardly of the forward ends of the teeth in the path of material lifted thereby, inclusive of means for dividing such collected material and depositing it at opposite sides of the carriage, means on the carriage for actuating the conveyor mechanism during forward movement of the carriage, and an elevating device on the carriage attached to the rake-element for moving the same about its pivot.

17. A device of the character described, comprising a carriage, inclusive of two wheel-supported sections in side-by-side relation, a rake-element pivotally supported at an end of each section with the ends of its teeth forward thereof resting on a surface over which it is moved in a position to collect loose material from such surface during forward movement of the carriage, a conveyor mechanism supported on each section rearwardly of the forward ends of the teeth in the path of material lifted thereby, inclusive of means for depositing such collected material at the open side of the section, said sections being loosely interconnected for limited independent movement to compensate for variations in elevation of the surface over which they are propelled, means on the carriage for actuating the respective conveyor mechanisms during forward movement of the carriage, and an elevating device on the carriage attached to each rake-section for moving the same about its pivot.

WILLIAM H. McELWAIN.